Sept. 6, 1932.  J. J. NOONAN  1,876,072
EGG TIMING DEVICE
Filed March 14, 1929   2 Sheets-Sheet 1
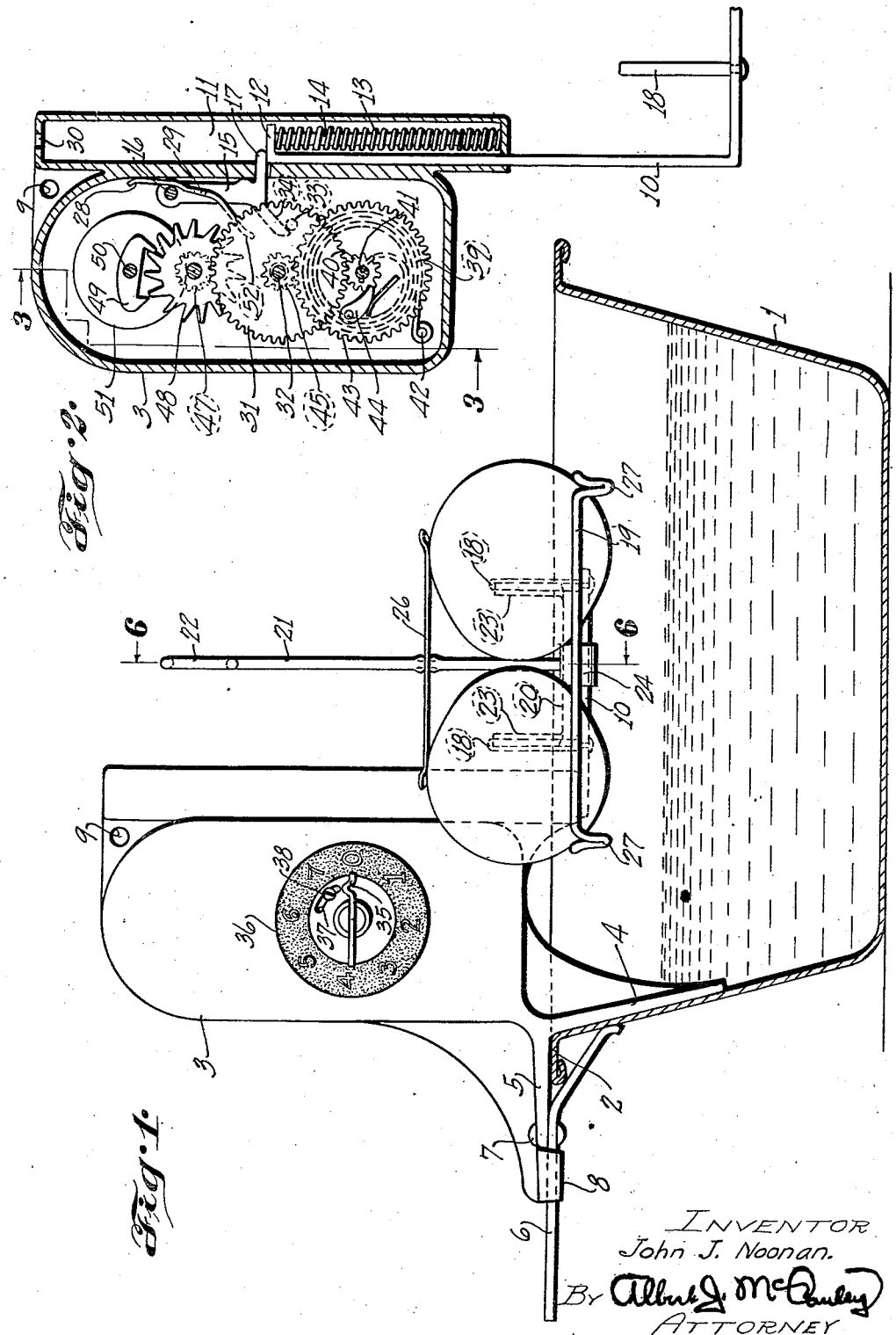
INVENTOR
John J. Noonan.
By Albert J. McCauley
ATTORNEY Sept. 6, 1932.   J. J. NOONAN   1,876,072
EGG TIMING DEVICE
Filed March 14, 1929   2 Sheets-Sheet 2
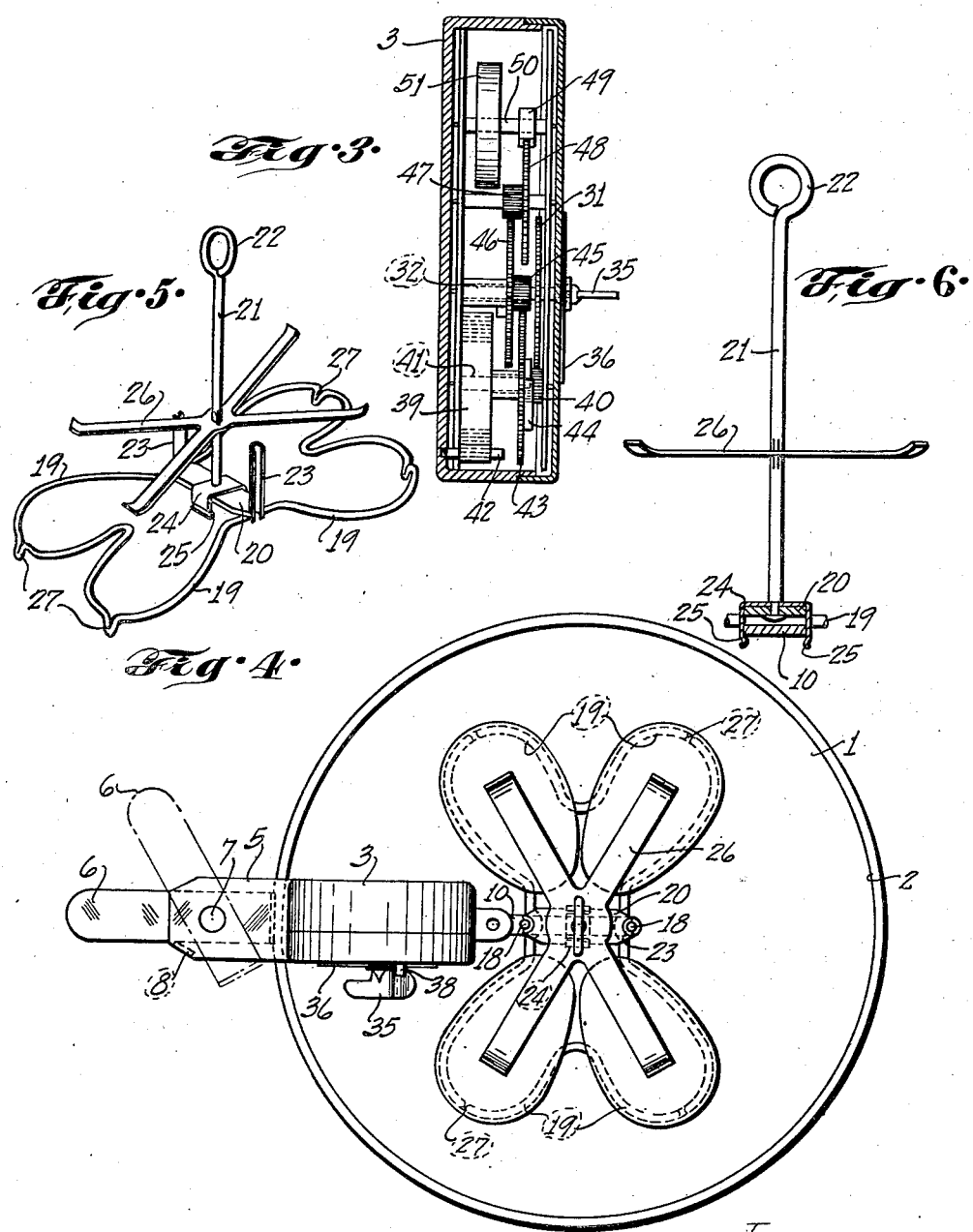
INVENTOR
John J. Noonan
By Albert J. McCauley
ATTORNEY Patented Sept. 6, 1932

1,876,072

UNITED STATES PATENT OFFICE

JOHN J. NOONAN, OF ST. LOUIS, MISSOURI, ASSIGNOR TO WILLIAM J. FITZMAURICE, OF ST. LOUIS, MISSOURI

EGG TIMING DEVICE

Application filed March 14, 1929. Serial No. 346,866.

This invention relates to egg timing devices for use in boiling eggs to determine the length of time in which the eggs are submerged.

One of the objects is to produce an egg timer adapted to be easily and quickly attached to, and detached from, the kitchen utensils ordinarily used to boil eggs. This enables the timing device to perform its function when associated with an ordinary utensil, and thereby not only reduces the cost of the complete apparatus, but also facilitates the cleaning of the timer and utensil while they are separated from each other, and enables the timer to be stored in a small space while the utensil may be used as desired for other purposes.

Another object is to produce an egg timer including a lifter whereby the eggs are automatically withdrawn from the water, and an egg holder removably secured to the lifter, so that the hot eggs can be conveniently removed from the device and placed upon a table, plate, or other article, where they may be cooled at points remote from the boiling water. To illustrate this feature I have shown an egg holder that can be easily removed from the device at any time, either after the eggs have been automatically lifted from the water, or before the expiration of the time for which the device is set. This enables the user to control the removal of the eggs independently of the timing device, so as to reduce the cooking period when an error has been made in setting the timer.

Another object is to prevent displacement of the eggs while they are submerged in the water. I have shown a retaining device securing the eggs to the egg holder, so that they cannot roll or float during the boiling period, and since the eggs are positively submerged to a predetermined level, a relatively small quantity of water may be placed in the pan to avoid delay and waste of fuel in heating the water to the desired temperature. A further advantage is gained by positively securing the eggs to a removable holder, as they will not be accidentally released when the holder is removed and placed upon a table or other article, and the same securing means prevents bouncing or other displacement of the eggs when they are quickly lifted by the automatic timing device.

Another object is to prevent accidental use of the device before the timer is set, and I have shown how this may be accomplished by restraining the clock mechanism and by preventing the egg holder from remaining in its depressed position until after a manually adjustable indicator is set for a selected time period.

A further object is to enable the time indicator to be set at any convenient time, and to thereafter automatically start the clock mechanism when the egg holder is lowered into the water.

A general object is to accomplish all of the foregoing results in a simple, compact and inexpensive device.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a side elevation, partly in section, showing a timing device embodying the features of this invention.

Fig. 2 is a vertical section showing the housing containing the clock mechanism and a portion of the lifter which extends downwardly from the housing.

Fig. 3 is a section taken approximately on the line 3—3 in Fig. 2.

Fig. 4 is a top view of the device shown in Fig. 1.

Fig. 5 is a perspective view of the removable egg holder.

Fig. 6 is a vertical section taken approximately on the line 6—6 in Fig. 1.

To illustrate one form of the invention I have shown a timing device secured to an ordinary pan 1 having a flange 2 at its upper edge. The timing device includes a housing 3 with an arm 4 (Fig. 1) engaging the inner face of the pan and an arm 5 seated upon the flange 2 at the top of the pan.

The detachable fastening means may include a lever 6 pivoted at 7 to the arm 5 and extending under the flange 2, as shown in Fig. 1, so as to engage said flange and also contact with the outer face of the pan at the point below the flange. Portions of the pan are thus clamped between the lever 6, and the diverging arms 4 and 5 to provide a firm support for the timing device. The lever 6 may be moved to the position shown by dot and dash lines in Figure 4 to detach the device from the pan. A stop 8 on the arm 5 limits the motion of the lever 6.

The housing 3 is provided at its upper end with a hole 9 to receive a nail, or the like, on which the device may be hung when it is not in service.

As shown in Figure 2, a lifter 10, preferably a L-shaped bar, has a vertical portion slidably mounted in a passageway 11 at one side of the housing. The upper end of said vertical portion is bent to form a seat 12 for a spring 13 which tends to elevate the lifter 10. A rod 14 in the spring 13 limits the downward motion of the lifter 10 and prevents excessive compression of the spring.

A trigger, or tripping member 15 shown in Figure 2, is pivoted at 16 and provided with a stop 17 adapted to engage the upper end of the lifter 10 so as to retain the lifter in its depressed position. I will hereafter explain the manner in which this trigger is operated by a clock mechanism to permit the spring 13 to elevate the lifter.

The horizontal lower portion of the lifter 10 (Figures 1, 2 and 4) is provided with a pair of vertical pins 18 adapted to interlock with an egg holder.

I have shown a removable egg holder comprising a wire frame having oval loops 19 which form seats for the eggs, a metal bar 20 seated upon and preferably welded to this wire frame, a handle including a vertical stem 21 secured to the bar 20, as shown in Figures 5 and 6, and an eye 22 at the top of said stem. The bar 20 lies over the horizontal portion of the lifter 10 and it has upstanding channels 23 at its ends adapted to embrace and interlock with the vertical pins 18 on the lifter. The egg holder is thus seated upon and detachably interlocks with the lifter, and it can be easily removed therefrom by grasping and lifting the eye 22 at the upper end of the stem, said eye being at all times entirely above the water level in the pan 1.

However, to prevent accidental displacement of the egg holder, it is provided with a spring clip 24 (Figures 5 and 6) adapted to embrace the horizontal portion of the lifter 10, said spring clip being offset at 25 to provide detents which detachably secure the egg holder to the lifter. These elements prevent accidental upward displacement of the egg holder relative to the lifter, but they do not prevent upward displacement of the eggs on the oval seats 19.

As a suitable means to prevent such displacement of the eggs I have shown a retaining device 26 above the seats 19 adapted to engage the top faces of the eggs as shown in Figures 1 and 4. This retaining device is preferably yieldable to permit free removal of the eggs and the device shown is an X-shaped spring secured to the stem 21 and having free ends which yieldingly engage the eggs.

It will now be understood that the egg holder shown in Fig. 5 can be very easily attached to and detached from the lifter 10, and that the retaining device 26 secures the eggs to positively hold them below the surface of the boiling water. The retaining device 26 also prevents accidental dropping of the eggs when the holder is removed from the lifter 10 and placed upon a table, or other article.

The removable egg holder has feet, or legs 27 which may be formed by downward extensions of the loops 19. These feet 27 serve as supports which separate the eggs from the article on which the holder is placed to cool the eggs.

A spring 28 is secured to the trigger 15 as indicated at 29 in Fig. 2. One end of this spring engages the inner face of the housing 3 to yieldingly hold the stop 17 in the path of the lifter 10. The lifter is depressed to the position shown in Fig. 22 by pushing upon the top of the stem 21 which lies considerably above the water level, and the spring 28 then forces the stop 17 to the position shown in Fig. 2.

After a predetermined lapse of time the clock mechanism shifts the trigger 15 to release the lifter 10, which is then thrown upwardly by the spring 13 to lift the eggs from the water. A vent hole 30 (Fig. 2) at the top of the passageway 11, permits steam to escape freely without condensing in the housing.

The timer includes a gear wheel 31 (Figures 2 and 3) rigidly secured to a shaft 32 and provided with a pin 33 adapted to engage a finger 34 on the trigger, so as to release the stop 17 from the lifter 10. This gear wheel 31 is driven by clock mechanism, as will be hereafter described, and said wheel can be set by hand to locate the pin 33 at different distances from the trigger, thereby determining the period of the cooking operation.

To illustrate a means for setting the timer, I have shown a handle 35 (Figures 1, 3 and 4) secured to the shaft 32, and associated with a dial 36 on the outside of the housing, the dial having numbers to indicate minutes. The dial is provided with a curved slot 37 (Fig. 1) to receive a screw 38 whereby the dial may be secured in different positions to compensate for variations in the spring actuated clock mechanism. The screw 38 also serves as a stop for the handle 35 to prevent undue winding of the clock spring which will be hereafter described.

In setting the timer, the handle 35 is turned to indicate the desired number of minutes on the dial, and this turns the gear wheel 31 (Fig. 2) to locate the pin 33 at a point more or less remote from the trigger.

Briefly stated, the clock mechanism includes a spring 39 which is wound by setting the timing wheel 31, and thereafter slowly unwound under the control of an escapement device as the timing wheel returns to its starting position.

The means for transmitting power from the timing wheel 31 to the spring 39 comprises a pinion 40 (Figures 2 and 3) meshing with the wheel 31, and a shaft 41 secured to said pinion. The inner end of the clock spring 39 is secured to the shaft 41, as indicated in Fig. 2, and the outer end is secured to the housing as shown at 42.

It will therefore be understood that the energy of the spring is increased by setting the timing wheel 31, and that this wheel is restored by a reverse movement of the pinion 40.

As a suitable means for retarding this reverse movement, I have shown a gear wheel 43 (Fig. 2) loosely mounted on the shaft 41 and connected to the pinion 40 by means of a pawl 44, and a train of gears driven by said gear wheel 43. This train of gears includes a pinion 45 loosely mounted on the timing shaft 32, a large gear 46 (Fig. 3) secured to said loose pinion 45, another pinion 47 meshing with said large gear 46, and an escapement wheel 48 (Figures 2 and 3) secured to said pinion 47. The escapement device includes a double pawl 49 fixed to an oscillatory shaft 50 and cooperating with the teeth of the escapement wheel, and a balancing wheel 51 also fixed to said shaft 50.

A very compact set of gears is obtained by arranging the loose gears 45 and 46 on the timing shaft 32, and these loose gears are free to turn at higher speeds than the timing gear 31. It is to be understood that the loose gears are driven to actuate the escapement device and thereby retard the timing gear 31 which is driven by pinion 40.

Assuming now that the timing gear 31 has been driven to release the stop 17 from the lifter 10, and that the spring 13 has elevated the lifter from the position shown in Fig. 2, the pin 33 on the timing gear will then retain the trigger 15 out of the path of the lifter 10 so if said lifter should be depressed when the parts are in this condition said lifter will be immediately restored by the spring 13

This will advise the user that the timing mechanism has not been set.

Furthermore, the spring 28 on the trigger (Fig. 2) has an extension 52 which engages the escapement wheel 48 to prevent operation of the train of gearing after the pin 33 forces the trigger away from the path of the lifter 10. The pin 33 also cooperates with the finger 34 to limit the return motion of the clock mechanism. Therefore, the clock mechanism cannot be operated until after the timer is set.

Another feature lies in the condition which allows the timer, including wheel 31 and its pin 33, to be set at any time without starting the clock mechanism, as this operation of the timer does not displace the trigger 15 which holds the restraining spring member 52 in contact with the escapement wheel 48. In other words, the stop 17 on the trigger engages the vertical face of the lifter 10 when the latter is elevated, and the trigger is not shifted until the lifter is depressed by hand. As a consequence, the trigger and spring extension 52 will prevent premature starting of the clock mechanism, and said mechanism will start automatically when the lifter is depressed to locate the egg in the boiling water.

It will now be understood that the small, simple, compact and inexpensive device herein shown, can be easily and quickly attached to an ordinary kitchen utensil; the eggs are securely held in the device, the egg holder can be easily removed without touching the hot eggs, the operator cannot use the device without setting the timer, and the timer may be set at any time without starting the clock mechanism until the eggs are submerged in the water.

I claim:

1. In an egg timing device having an egg lifter, a timer controlling said lifter, said timer including a stop restraining said lifter, a timing member whereby said stop is actuated to release said lifter, clock mechanism to actuate said timing member, and a restraining member whereby said clock mechanism is stopped when the lifter occupies its elevated position.

2. In an egg timing device having an egg lifter, a timer controlling said lifter, said timer including a manually adjustable timing member to predetermine the time of the operation, clock mechanism adapted to move said timing member, a restraining member to prevent operation of said clock mechanism, and means whereby said restraining member is released in response to a downward movement of said lifter.

3. In an egg timing device having an egg lifter, a timer controlling said lifter, said timer including a manually adjustable timing member to predetermine the time of the operation, clock mechanism adapted to move said timing member, a restraining member to prevent operation of said clock mechanism, and means whereby said restraining member is released in response to a downward movement of said lifter, said means including a spring tending to release said restraining member and a stop to prevent operation of said restraining member while the lifter occupies its elevated position.

4. In an egg timing device having an egg lifter, a timer controlling said lifter, said timer including a stop restraining said lifter, a timing member whereby said stop is actuated to release said lifter, clock mechanism to actuate said timing member, and a restraining member whereby said clock mechanism is stopped when the lifter occupies its elevated position, said restraining member being under the control of said timing member so as to prevent operation of said clock mechanism until after the timing member is set to predetermine the time of the operation and the lifter is pressed.

5. In an egg timing device having an egg lifter, a timer controlling said lifter, said timer including a stop to restrain said lifter, an adjustable timing member whereby said stop is actuated to release said lifter, clock mechanism whereby said adjustable timing member is driven, a restraining member to prevent operation of said clock mechanism, said adjustable timing member being movable independently of said stop and restraining member to predetermine the time of the egg timing operation, and said stop and restraining member being movable in response to a downward movement of said lifter.

6. In an egg timing device having an egg lifter, a timer controlling said lifter, said timer including a stop to restrain said lifter, an adjustable timing member whereby said stop is actuated to release said lifter, clock mechanism whereby said adjustable timing member is driven, a restraining member to prevent operation of said clock mechanism, said adjustable timing member being movable independently of said stop and restraining member to predetermine the time of the egg timing operation, and means for releasing said restraining member and moving said stop into the path of said lifter in response to a downward movement of said lifter.

7. In an egg timing device having an egg lifter, a timer controlling said lifter, said timer including a stop to restrain said lifter, an adjustable timing member whereby said stop is actuated to release said lifter, clock mechanism whereby said adjustable timing member is driven, a restraining member to prevent operation of said clock mechanism, said adjustable timing member being movable independently of said stop and restraining member to predetermine the time of the operation, and means for releasing said restraining member and moving said stop into the path of said lifter in response to a downward movement of said lifter, said means including a spring associated with said restraining member and stop.

In testimony that I claim the foregoing I hereunto affix my signature.

JOHN J. NOONAN.